United States Patent [19]

Monchalin

[11] 4,426,155
[45] Jan. 17, 1984

[54] METHOD AND APPARATUS FOR THE INTERFEROMETRIC WAVELENGTH MEASUREMENT OF FREQUENCY TUNABLE C.W. LASERS

[76] Inventor: Jean-Pierre Monchalin, 4956 Earnscliffe, Montreal, Quebec, Canada

[21] Appl. No.: 309,583

[22] Filed: Oct. 8, 1981

[51] Int. Cl.³ .............................................. G01B 9/02
[52] U.S. Cl. .................................... 356/346; 356/349
[58] Field of Search ................ 356/346, 357, 358, 349

[56] References Cited

U.S. PATENT DOCUMENTS

| | | | |
|---|---|---|---|
| 4,052,129 | 10/1977 | Schawlow et al. | 356/346 |
| 4,165,183 | 8/1979 | Hall et al. | 356/346 |
| 4,319,843 | 3/1983 | Gornall | 356/346 |

*Primary Examiner*—William L. Sikes
*Assistant Examiner*—Matthew W. Koren
*Attorney, Agent, or Firm*—Swabey, Mitchell, Houle, Marcoux & Sher

[57] ABSTRACT

The invention relates to a method and an apparatus for measuring the wavelength of an object beam of electromagnetic radiation generated from a first source by comparing with a reference of known wavelength generated from a second source A fringe-counting Michelson-type interferometer is used, having a stationary arm and a variable arm and includes a planar beam splitter a planar beam mixer, a planar reflector in the stationary arm, and a movable retroreflector in the variable arm. Prior to moving the retroreflector the reference and object beams are aligned to provide a flat interference pattern. The portions of the reference and object beams in the moveable arm are directed to and reflected by the retroreflector off center thereof. The portions of the reference and object beams in the stationary arm have an angle of reflection α at the reflector. The beam mixer is situated relative to the beam splitter such that the plane of the beam mixer is angularly inclined with respect to the plane of the beam splitter by an angle equal to α. Parallelism of the second beam portions with one another in the variable arm of the interferometer is automatically provided as a result of the alignment of the reference and object beams to a flat interference pattern, without optical feedback of the beams to their respective source and parasitic diffraction effects by the retroreflector.

36 Claims, 5 Drawing Figures

METHOD AND APPARATUS FOR THE INTERFEROMETRIC WAVELENGTH MEASUREMENT OF FREQUENCY TUNABLE C.W. LASERS

BACKGROUND OF THE INVENTION (a) Field of the Invention

The present invention relates to a method and an apparatus for the interferometric wavelength measurement of electromagnetic radiation. The invention is particularly directed toward measuring in a reliable and convenient manner the absolute wavelength of frequency tunable continuous wave laser radiation, using a fringe-counting Michelson-type interferometer.

(b) Description of Prior Art

As is well known, in the Michelson interferometer, an incoming beam of light is split into two beans by a beam splitter. One of the split beams is caused to travel a fixed optical path length by being directed toward a stationary mirror and then reflected back to the beam splitter while the other split beam is caused to travel an optical path length which is varied by being directed toward a moving mirror and reflected back toward the beam splitter; the portion of the interferometer in which one of the split beams travels a fixed optical path length is often called the stationary arm of the interferometer, whereas the portion in which the other split beam travels a varying optical path length is referred to as the variable arm of the interferometer. The reflected beams recombine in a manner depending on the difference between the optical paths they have travelled to provide an interference pattern characterized by a series of alternating bright reinforcement fringes and dark annulment fringes. The bright reinforcement fringes are provided as a result of two waves arriving in phase at a given plane, such as a viewing screen, whereas the dark annulment fringes are provided when two waves arrive out of phase at such plane. These fringes may be easily detected and counted to determine the absolute wavelength of the source of light as the interferometer mirror is moved through a known distance.

The known distance can be accurately obtained by simultaneously counting the number of fringes produced from a standard wavelength source for the same change of optical path length. This principle has been used in the wavemeters proposed by Schawlow et al. in U.S. Pat. No. 4,052,129 and by Hall et al. in U.S. Pat. No. 4,165,183, for accurate wavelength measurement of CW laser light. These devices are based on a two-beam interferometer in which the motion of the interferometer mirror produces the same variation in the respective optical path lengths travelled by a first reference beam of known wavelength and a second beam of unknown wavelength. Thus, by comparing the number of fringes detected for the unknown wavelength $\lambda_U$ with that of the reference wavelength $\lambda_R$, it is possible to calculate $\lambda_U$ since the ratio of the respective wavelengths is equal to the reciprocal of the ratio of the respective fringe counts.

In the wavemeter of Schawlow et al., the reference and unknown laser beams travel identical paths in opposite directions and emerge at separate detectors. A corner-cube retroreflector coasting on an air track is used as moving mirror. To eliminate systematic errors due primarily to misalignment of the two laser beams with respect to each other, the reference beam and the unknown beam are superposed so as to be colinear, thereby ensuring that the path lengths travelled by the two beams are nearly identical. Practically, this is done when using visible laser beams by visually bringing the laser spots of light into coincidence on at least two optical surfaces of the interferometer which are sufficiently remote from one another. However, when it is desired to align in an invisible laser beam with a visible reference laser beam, the alignment procedure is more complex and necessitates an additional detector for electronically "visualizing" the invisible beam so as to achieve an adequate superposition of the two beams. Thus, such wavemeter is limited in practice and commercial use to the measurement of visible laser wavelengths.

In the device of Hall et al., the beams from the two laser sources travel parallel paths in a double corner-cube interferometer. The beams enter different sectors of the corner-cube retroreflectors which are mounted back-to-back on a moving carriage, and a phase-locked resolution extender incorporating a frequency multiplier provides enhanced fringe resolution. Since the reference and unknown beams are spatially separated, particular care must be taken to avoid any slight misalignment of the beams from parallelism in the direction of translation of the retroreflectors which would result in a systematic error. The alignment procedure proposed by Hall et al is carried out by removing the carriage out of the optical path and adjusting the unknown laser beam so that it coincides with the emerging reference beam. It follows that such alignment procedure is extremely inconvenient especially when the interferometer is evacuated, and renders the wavemeter commercially unattractive.

In summary, the wavemeters of the above type do not permit an automatic alignment of the unknown laser beam with the reference laser beam. It should also be noted that the optical arrangement of both the Schawlow et al. and Hall et al. wavemeters is such that there is no discrimination of the incoming direction of the respective beams, that is, there is always an interference pattern produced regardless of the beam incoming direction.

In order to permit an automatic alignment of the beams parallelism in a wavemeter of the Michelson type, applicant has already shown in his article entitled "Wavelength Comparison Between Lasers," Frontiers in Laser Spectroscopy, North-Holland Publishing Co., 1977, pages 695–712, that a planar mirror should be used in one of the interferometer arms and a corner-cube retroreflector in the other arm. The alignment of the two beams of different wavelengths sent to the corner-cube retroreflector is achieved automatically when the interferometer is adjusted to give a flat interference pattern. In order to observe flat fringes, the two beams of different wavelengths have to be perpendicular to the planar mirror. The provision of a planar mirror in the stationary arm of the interferometer causes a discrimination of the incoming direction of the respective beams so that a flat interference pattern will be produced only at a unique beam incoming direction corresponding to the alignment of the two beams. Since in the system proposed earlier by Applicant, this unique alignment condition is satisfied when the two beams are directed perpendicularly to the planar mirror and thus necessitates using the center of the corner-cube retroreflector, such system suffers from two major drawbacks: optical feedback to the laser source and parasitic diffraction effects by the corner-cube retroreflector. Feedback to the laser is a serious problem as the intensity and the frequency of the laser are perturbed.

SUMMARY OF THE INVENTION

It is therefore an object of the invention to eliminate the aforesaid drawbacks and to provide a method and an apparatus for the interferometric wavelength measurement of electromagnetic radiation, which enables one to achieve an automatic alignment of the radiation beams sent to the interferometer retroreflector without causing feedback to the radiation sources and parasitic diffraction effects by the retroreflector.

According to one aspect of the present invention, there is provided an improved method of measuring the wavelength of an object beam of electromagnetic radiation generated from a first source means by comparing with a reference beam of known wavelength generated from a second source means. A fringe-counting Michelson-type interferometer is used, which has a stationary arm and a variable arm and includes a planar beam splitting means for splitting each of the reference and object beams into first and second beam portions, planar beam mixing means for recombining the respective first and second beam portions of the reference and object beams, planar reflection means arranged in the stationary arm for reflecting the respective first beam portion of the reference and object beams to the beam mixing means and movable retroreflection means having an optical center and arranged in the variable arm for reflecting the respective second beam portion of the reference and object beams to the beam mixing means. The improvement resides in aligning the reference and object beams to provide a flat interference pattern for each beam sent to the beam splitting means at only one incident direction, prior to moving the retroreflection means, by causing the reference and object beams to travel along respective optical paths lying in respective parallel planes which normally intersect the planes of the beam splitting means, the beam mixing means and the reflection means and pass through the optical center of the retroreflection means, the respective second beam portion of the reference and object beams being directed to and reflected by the retroreflection means off center thereof, reflecting with the reflection means the respective first beam portion of the reference and object beams at an angle of reflection $\alpha$, and disposing the beam mixing means relative to the beam splitting means such that the plane of the beam mixing means is angularly inclined with respect to the plane of the beam splitting means by an angle equal to $\alpha$ and that the beam mixing means is oriented to receive the respective reflected first and second beam portions of the reference and object beams symmetrically with respect to the plane thereof. Parallelism of the second beam portions with one another in the variable arm of the interferometer is automatically provided as a result of the alignment of the reference and object beams to a flat interference pattern, without optical feedback of the beams to their respective source means and parasitic diffraction effects by the retroreflection means.

A method in accordance with the invention for the interferometric wavelength measurement of an object beam of electromagnetic radiation using a reference beam of known wavelength thus includes the steps of splitting the reference beam to form first and second beam portions travelling respective optical path lenths in the stationary and variable arms of the interferometer and oriented symmetrically with respect to a first plane, reflecting the first reference beam portion in the stationary arm at an angle of reflection $\alpha$ and reflecting the second reference beam portion in the variable arm while varying the optical path length travelled thereby, the reflected first and second reference beam portions being symmetrical with respect to a second plane which is angularly inclined with respect to the first plane by an angle equal to $\alpha$. The reflected first and second reference beam portions are recombined and the number of fringes generated by the interference thereof is detected as the optical path length travelled by the second reference beam portion is varied.

Similarly, the object beam is split to form first and second beam portions travelling respective optical path lengths in the stationary and variable arms and oriented symmetrically with respect to one of the aforesaid first and second planes. The first object beam portion is reflected in the stationary arm at the same angle of reflection $\alpha$ and the second object beam portion is reflected in the variable arm while the optical path length travelled thereby is varied to the same extent as the optical path length travelled by second reference beam portion is varied, the reflected first and second object beam portions being symmetrical with respect to the other of the aforesaid planes. The reflected first and second object beam portions are recombined and the number of fringes generated by the interference thereof is detected as the optical path length travelled by the second object beam portion is varied. The numbers of fringes corresponding to the reference and object beams are then compared so as to determine the wavelength of the object beam.

According to a further aspect of the invention, there is provided in a fringe-counting Michelson-type interferometer as above defined, the improvement wherein the beam splitting means, beam mixing means, reflection means and retroreflection means are optically coupled to each other and to the source means so as to cause the reference and object beams to travel along respective optical paths lying in respective parallel planes which normally intersect the planes of the beam splitting means, the beam mixing means and the reflection means and pass through the optical center of the retroreflection means, the retroreflection means being positioned to receive and to reflect off center thereof the respective second beam portion of the reference and object beams, the reflection means being positioned to reflect the respective first beam portion of the reference and object beams at an angle of reflection $\alpha$, the beam mixing means being disposed relative to the beam splitting means such that the plane of the beam mixing means is angularly inclined with respect to the plane of the beam splitting means by an angle equal to $\alpha$ and that the beam mixing means is oriented to receive the respective reflected first and second beam portions of the reference and object beams symmetrically with respect to the plane thereof.

A wavemeter in accordance with the invention for the interferometric wavelength measurement of an object beam of electromagnetic radiation generated from a first source means using a reference beam of known wavelength thus includes the following components:
  a second source means for generating the reference beam of known wavelength;
  means for splitting each of the reference and object beams into first and second beam portions travelling respective optical path lengths in the stationary and variable arms of the interferometer and oriented symmetrically with respect to a respective first plane;

reflection means in the stationary arm for reflecting the respective first beam portion of the reference and object beams at an angle of reflection $\alpha$;

retroreflection means in the variable arm for reflecting the respective second beam portion of the reference and object beams, the retroreflection means being movable to equally vary the optical path lengths travelled by the second beam portions, the reflection means and retroreflection means being arranged so as to orient the respective reflected first and second beam portions of the reference and object beams symmetrically with respect to a respective second plane which is angularly inclined relative to the respective first plane by an angle equal to $\alpha$;

means positioned in the respective second plane for recombining the respective reflected first and second beam portions of the reference and object beams;

first output means for detecting the number of fringes produced by the reference beam interference; and second output means for detecting the number of fringes produced by the object beam interference.

The interferometric wavemeter of the invention is particularly designed for measuring the absolute wavelength of frequency tunable continuous wave lasers. The invention fulfills the conditions necessary to an accurate and convenient measurement, namely:

the changes in the path lengths travelled by the reference and object beams in the variable arm of the interferometer are exactly the same;

the optical arrangement of the interferometer components is such that the equality of the change in path lengths is automatically provided;

the interferometer does not feed any light back to the laser sources thus avoiding perturbation of their operation;

the interferometer is of a broad band use and the only limitations are from the finite transparency bandwidth of the optical materials utilized; and the interferometer is achromatic, meaning that when it is adjusted for a measurement at a selected wavelength, mere change of this wavelength does not change the alignment conditions and a new measurement can be readily started at the new wavelength without readjustment.

As accurate parallelism of the reference and object means with one another is provided in the variable arm of the interferometer, the invention enables one to achieve an accuracy of measurement exceeding one part in $10^9$.

BRIEF DESCRIPTION OF THE DRAWINGS

The invention is illustrated by way of example in the accompanying drawings, in which.

DESCRIPTION OF PREFERRED EMBODIMENTS

Figure 1:
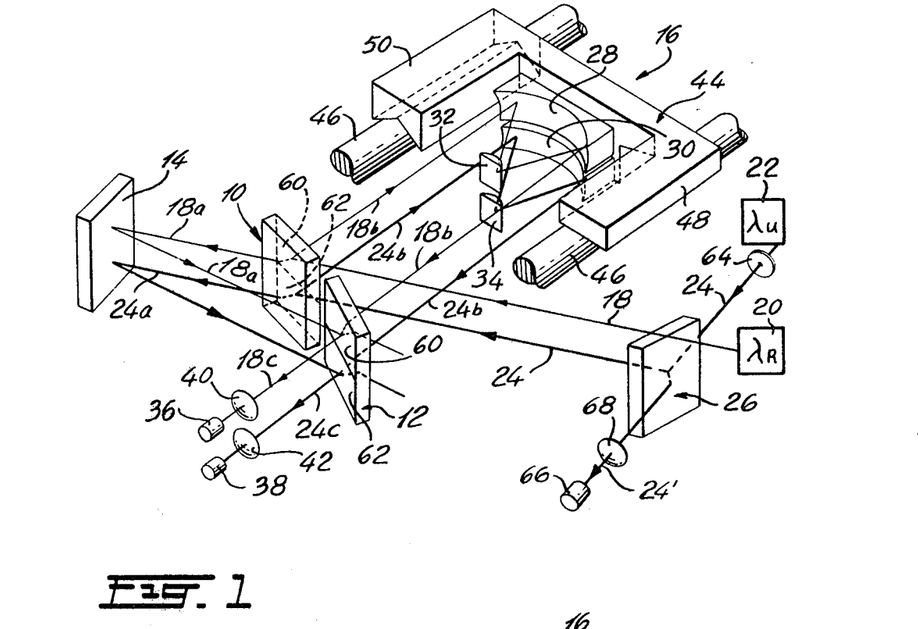
FIG. 1 is a schematic perspective view of a wavemeter according to a first embodiment of the invention.

Referring to FIG. 1, there is shown an interferometric system comprising four main components, namely, two planar beam splitters 10 and 12, a stationary planar mirror 14 and a movable retroreflector 16. A laser beam 18 of known wavelength is generated by the reference laser source 10 which may comprise, for example, a stabilized He-Ne laser at 6328 Å, a stabilized He-Ne laser at 3.39 $\mu$m or a narrow emission line of a gas discharge. The laser source to be measured is designated by numeral 22. One may refer to this source as providing an object beam 24 of unknown wavelength $\lambda_U$ to distinguish it from the reference wavelength $\lambda_R$.

As shown, the two beams 18 and 24 travel in the same direction along non-overlapping parallel paths at different heights. They are each split into two beam portions 18a,18b and 24a,24b by the beam splitter 10. Beam 24 is directed onto the beam splitter 10 by means of a third beam splitter 26, the exact function of which will be hereinafter explained in detail. The beam portions 18a and 24a transmitted by the beam splitter 10 are reflected by the planar mirror 14 onto the second beam splitter 12. The beam portions 18b and 24b reflected by the beam splitter 10 are sent onto the double cat's eye retroreflector 16 comprising a pair of large radius concave mirrors 28 and 30 provided with respective convex mirrors 32 and 34 at their focal points; the two retroreflectors 28,32 and 30,34 are mounted on top of each other, the former for the reference beam portion 18b and the latter for the object beam portion 24b. The beams 18b and 24b exit from these two retroreflectors parallel to their incident direction and then pass through the beam splitter 12. The beam splitter 12 which serves as a beam mixer recombines the beams 18a and 24a reflected by the mirror 14 with the respective beams 18b and 24b reflected by the retroreflector 16 to provide single reference and object beams 18c and 24c emanating from the interferometer and each generating a pattern of interference fringes caused by the change of path lengths as the retroreflector 16 is being moved.

The interference patterns produced are detected by detector 36 for reference beam 18c and detector 38 for object beam 24c, focussing on these detectors being effected by means of lens 40 and 42. The detector outputs are delivered to a conventional counter (not shown) which records the number of fringes counted within any given period of time; the fringe counting technique proposed by Hall et al. in his U.S. Pat. No. 4,165,183 can be advantageously adopted for high accuracy measurements. The ratio of the number of fringes counted for the two separate sources 20 and 22 is in inverse proportion to their respective wavelengths so that the wavelength $\lambda_U$ of the object beam 24 can be immediately determined by the number of counts and can readily be displayed as a digital representation on the counter itself.

The retroreflectors 28,32 and 30,34 are mounted to the bight portions of a U-shaped carriage 44 which is slidably movable on a pair of polished stainless steel cylindrical rods 46. One arm 48 of the carriage is formed on its underside with a planar surface in contact with the rod 46 while the other arm 50 has a V-shaped contact surface so as to provide guidance. For smooth displacement, the contact surfaces of arms 48 and 50 are covered with a TEFLON (trademark) coating. The carriage 44 is driven by a conventional driving system (not shown) which insures a nearly uniform velocity of travel with minimal vibration. The carriage driving system may include, for example, an AC synchronous motor with pulleys, steel cable and a flywheel used as a mechanical filter, or a linear induction motor. By using the carriage 44 riding on rods 46 to move the retroreflectors 28,32 and 30,34 rather than a carriage coasting on an air track as in the Schawlow et al. device, it is possible to operate the interferometer in vacuum or under low pressure and thus to not take into account the refractive index of the air which otherwise should be considered during normal atmospheric operation.

The planar beam splitters 10 and 12, the planar mirror 14 and the retroreflectors 28,32 and 30,34 are optically coupled to each other and to the laser sources 20 and 22 such as to cause the reference and object beams to travel along respective optical paths lying in respective parallel planes which normally intersect the planes of the beam splitters 10 and 12 and of the mirror 14 and pass through the respective optical center of the retroreflectors 28,32 and 30,34. The reference and object beam portions 18b and 24b are directed to and reflected by their respective retroreflectors off center thereof, thereby avoiding parasitic diffraction effects by the retroreflectors. In the embodiment represented in FIG. 1, the planes along which the reference and object beams travel are spacedly separated owing to the relative position of the laser sources 20 and 22.

In order to automatically provide accurate parallelism of the reference and object beam portions 18b and 24b with one another in the variable arm of the interferometer, the reference and object beams 18 and 24 are aligned to provide at the output detectors 36 and 38 a flat interference pattern for each beam sent onto the beam splitter 10 at only one incident direction, prior to moving the retroreflector 16. As already mentioned, the provision of the planar mirror 14 in the stationary arm of the interferometer causes a discrimination of the beam incoming direction. This is better understood with reference to FIGS. 2 and 3 in connection with the reference beam 18. As best shown in FIG. 3, the beam portions 18a and 18b formed by the beam splitter 10 are oriented symmetrically with respect to the plane of the beam splitter 10. The mirror 14 is positioned to reflect the beam portion 18a at an angle of reflection $\alpha$. In order that the beam portion 18a reflected by the mirror 14 and the beam portion 18b reflected by the retroreflector 16 interfere and produce a flat interference pattern, the beam splitter 12 must be disposed relative to the beam splitter 10 such that the plane thereof is angularly inclined with respect to the plane of the beam splitter 10 by an angle equal to the angle of reflection $\alpha$. It should also be noted that the beam splitter 12 is oriented so as to receive the reflected beam portions 18a and 18b symmetrically with respect to the plane defined thereby.

Since the beam splitters 10 and 12 and the mirror 14 are pre-positioned for a predetermined angle $\alpha$ and are disposed perpendicularly to a reference plane intersecting them, a flat interference pattern will be observed at the output detector if and only if the reference beam 18 is directed onto the beam splitter 10 in or parallel to the reference plane and at an angle of incidence such that the transmitted beam portion 18a is reflected by the mirror at the predetermined angle $\alpha$, which therefore corresponds to a unique incident direction. When this condition is satisfied, the beam is then said to be aligned to a flat interference pattern. As it is apparent, since the mirror 14 is not oriented perpendicularly to the incident beam 18a transmitted by the beam splitter 10, this optical arrangement does not give any feedback to the laser source 20.

The above also applies to the object beam 24 of unknown wavelength since the same components of the interferometer are used for both the reference and object beams. Thus, in order to observe a flat interference pattern for the object beam 24, this beam must be directed onto the beam splitter 10 such that it follows a path lying in a plane parallel to the plane along which the reference beam travels and that the beam portion 24a transmitted by the beam splitter 10 is reflected by the mirror 14 at the same predetermined angle $\alpha$. As a consequence, the reference and object beam portions 18b and 24b are accurately parallel to each other in the variable arm of the interferometer where the optical path lengths are varied. It should be noted that this important condition of the equality of change in the path lengths for the two beams in the variable arm is automatically fulfilled when the reference and object beams are each aligned to a flat interference pattern. It is also apparent that the interferometer is achromatic, since the alignment conditions do not change when the wavelengths of the reference and object beams are varied.

Once the parallelism of the reference and object beam portions 18b and 24b with one another in the variable arm of the interferometer is ensured, the retroreflector 16 can then be moved to vary the path length of the beams and to thereby produce at each output detector a pattern of interference fringes which are counted so as to determine the absolute wavelength of the object beam.

Figure 2:
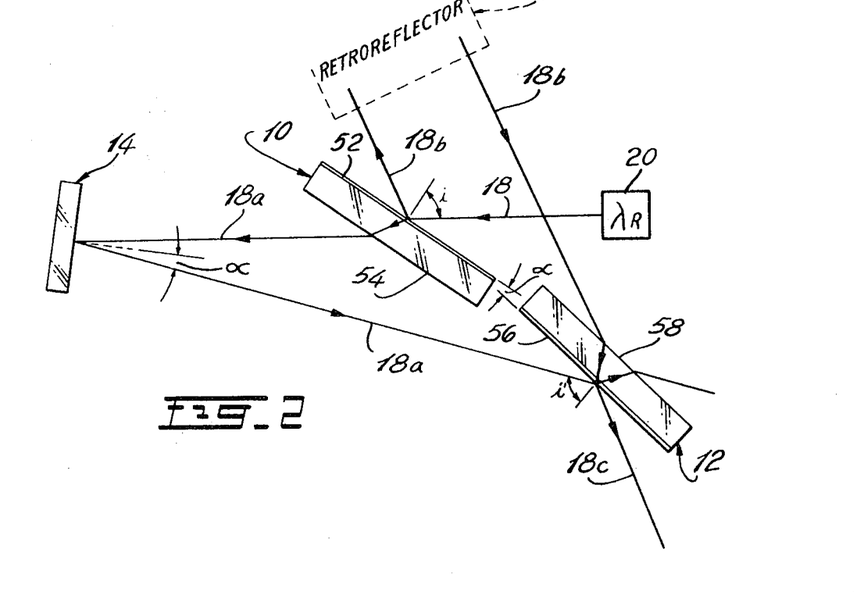
FIG. 2 is a fragmentary schematic plan view of the embodiment of FIG. 1.
Figures 3, 4:
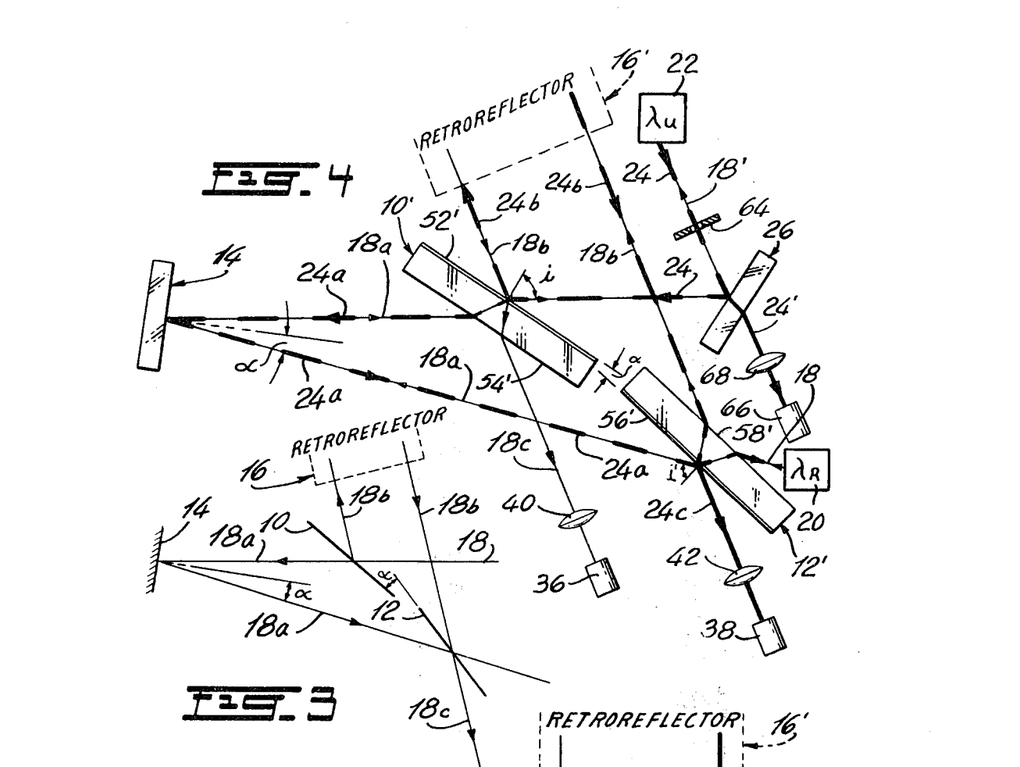
FIG. 3 is a schematic diagram of the embodiment represented in FIG. 2.
FIG. 4 is a schematic plan view of a second embodiment according to the invention.

Referring in particular to FIG. 2, the beam splitters 10 and 12 used respectively each have opposed parallel surfaces 52,54 and 56,58, the surfaces 52 and 56 being partially reflective and having the angle of inclination $\alpha$ defined therebetween. Since in the embodiment of FIG. 1 the reference and object beams are spacedly separated, the partially reflective surfaces 52 and 56 are each advantageously provided with a different partially reflective coating for each beam. Thus, the upper halves of the surfaces 52 and 56 may have a coating 60 especially adapted for the reference wavelength and the lower halves a broadband 50% reflective coating 62, as best shown in FIG. 1.

In order to prevent parasitic reflection effects at the uncoated surfaces 54 and 58, the reference and object beams 18 and 24 are polarized parallely to the planes along which they travel and are each directed onto the coated surface 52 of beam splitter 10 at an angle of incidence i closed to the Brewster angle. The reference and object beam portions 18a and 24a reflected by the mirror 14 are each directed onto the coated surface 56 of beam splitter 12 at an angle of incidence i' also close to the Brewster angle, due to optical arrangement of the system. Actually, the angles of incidence i and i' are slightly different from the Brewster angle and the Brewster angle is wavelength dependent. In practice, one selects an angle of incidence i such that i = Brewster angle (for the average wavelength to be measured) $-\alpha/2$; it follows that the angle of incidence i' on beam splitter 12 is equal to the Brewster angle $+\alpha/2$, the angle $\alpha$ being typically 5°. Since the reflectivity of a surface for an angle of incidence close to the Brewster angle is a very slowly varying function of the angle and of the wavelength, one concludes that the uncoated surfaces 54 and 58 of beam splitters 10 and 12 have, over a very broad range of wavelength, an extremely small reflectivity which can be neglected.

In the embodiment illustrated in FIG. 1, the alignment of the reference beam 18 to a flat interference pattern is done once for all, since the laser source 20 is part of the apparatus. The alignment procedure for the object beam 24 generated from the laser source 22 which is located exteriorly of the apparatus may be very conveniently affected as follows: the laser source 22 is first positioned so as to direct the beam 24 generated therefrom through the aperture of an apertured element 64 which is conjugated with the detector 66 by means of the lens 68. A beam splitter 26 is mounted in the optical path of the beam 24 between the apertured element 64 and the detector 66 for reflecting the beam to the beam splitter 10 and transmitting a beam portion 24' thereof to the detector 66. The apertured element 64 and the detector 66 are positioned so as to cause the beam to pass through the beam splitter 26 at a point located in the desired plane of incidence. The detector 66 detects the intensity of the transmitted beam portion 24', and when maximum intensity is observed proper positioning of the source 22 is achieved. This initial positioning odf the source 22 enables the beam 24 to intersect the plane of the beam splitter 26 at the correct vertical position with respect to the retroreflectors 30,34, in the desired plane of incidence. Thereafter, the beam splitter 26 which is rotatable about the vertical axis as well as the horizontal axis to vary the direction of the reflected beam is adjusted in order to obtain a flat interference pattern at the output detector 38, thereby indicating that the correct angle of reflection α at the mirror 14 is achieved.

In the wavemaster just described, the reference and object beams 18 and 24 are polarized parallely to the respective planes along which they travel. Accordingly, cat's eye retroreflectors are preferred to corner-cube retroreflectors since they do not change the polarization of the reflected beams. Corner-cube retroreflectors with metal coatings introduce very small phase shifts and polarization changes and, therefore, can be used with very negligible effects. There is no requirement for the object beam other than to be within the bandwidth of the coating 62, since owing to the use of two retroreflectors 28,32 and 30,34, the optical paths travelled by the reference and object beams 18 and 24 are totally independent.

For applications where the unknown wavelength is very different from the reference wavelength, such as in the measurement of an infrared wavelength by comparing with a visible standard, a single retroreflector may be used. In this case, the reference and object beams are superposed so as to be colinear and to thus travel in the same direction along overlapping paths lying in a common plane. They are readily channeled to their respective detectors with a beam splitter made of a single plate which is transparent to one wavelength and opaque to the other wavelength; for example, when measuring an infrared wavelength using a visible standard, a plate of silicon or germanium may be employed.

In the case where the two wavelengths cannot be easily discriminated at the output before the detectors (for example, two visible wavelengths would require a dichrouml/i/ c filter or a monochromator), one can still use a single retroreflector by sending the two beams in opposite directions. This version of the interferometer is illustrated in FIG. 4.

As shown in FIG. 4, the reference and object beams 18 and 24 travel in opposite directions along overlapping paths lying in a common plane, the path followed by the reference beam being indicated with thin arrows and the path followed by the object beam with thick arrows. The reference beam 18 is split by the beam splitter 12' for ultimate recombination of the split beam portions 18a and 18b on the beam splitter 10', whereas the object beam 24 is split by the beam splitter 10' for ultimate recombination of the split beam portions 24a and 24b on the beam splitter 12'. The beam splitters 10' and 12' respectively each have opposed parallel surfaces 52',54' and 56',58', the surfaces 52' and 56' being partially reflective and having the angle of inclination α defined therebetween. The partially reflective surfaces 52' and 56' are each provided with a single partially reflective coating which is the same for both.

The embodiment represented in FIG. 4 has the advantage of using a single retroreflector 16' but has one minor limitation: since the reference beam portion 18' emanating from the interferometer is sent into the laser source 22 of unknown wavelength, such wavemeter cannot be used to measure a wavelength too close to the reference wavelength. On the other hand, the reference beam portion 18' can advantageously be used as a tracer beam to facilitate the alignment of the object beam 24 generated from the source 22 through the aperture of the aperture element 64 and onto the detector 66.

As mentioned previously, parasitic reflection from the uncoated surfaces of the beam splitters is avoided by sending the beam thereon at an angle of incidence close to the Brewster angle. This problem may also be solutioned by using wedge-shaped beam splitters, as shown in FIG. 5.

Figure 5:
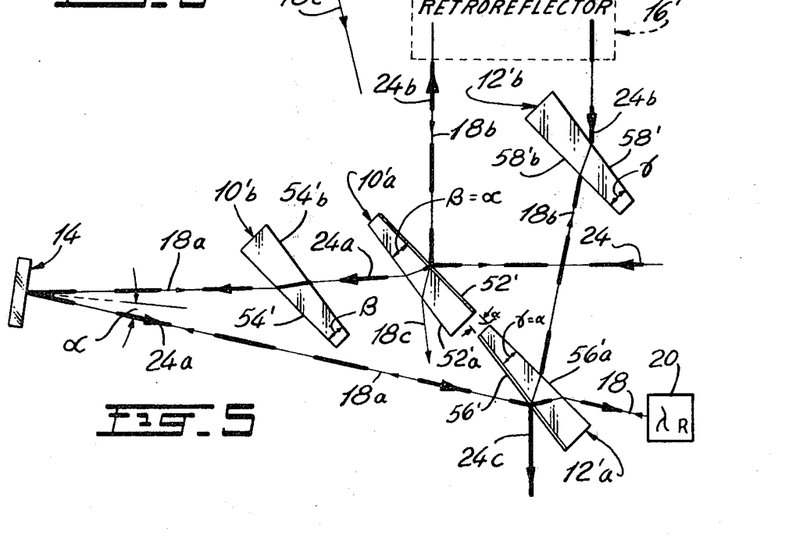
FIG. 5 is a fragmentary schematic plan view of a third embodiment according to the invention.

The embodiment represented in FIG. 5 is essentially the same as that of FIG. 4, if one considers that the beam splitters 10' and 12' shown in FIG. 4 are dissected along an oblique plane so as to respectively form the wedge-shaped elements 10'a,10'b and 12'a,12'b shown in FIG. 5. Thus, the wedge-shaped beam splitters 10'a and 12'a respectively each have a planar partially reflective surface 52' and 56' and an opposed planar surface 52'a and 56'a, the wedge angle β being defined between the surfaces 52' and 52'a of the beam splitter 10'a and the wedge angle γ between the surfaces 56' and 56'a of beam splitter 12'a. The partially reflective surfaces 52' and 56' are each provided with a single partially reflective coating which is the same for both. The beam splitters 10'a and 12'a defined prisms which prevent parasitic reflections at the uncoated surfaces 52'a and 56'a. Accordingly, there is no need for antireflection coatings on the surfaces 52'a and 56'a: beams which are reflected several times inside the prisms are easily discriminated, since they propagate in directions different from the incident directions of the main beams, or are much too weak to be troublesome.

The wedge-shaped elements 10'b and 12'b which are respectively associated with the beam splitters 10'a and 12'a defined compensators for compensating the prismatic dispersion of the beam splitters; the wavemeter is therefore truly achromatic. The compensators 10'b and 12'b respectively each have opposed planar surfaces 54',54'b and 58',58'b with the same wedge angle β and γ as their associated beam splitters 10'a and 12'b. It should be noted that the surface 54'b of the compensator 10'b which faces the surface 52'a of the beam splitter 10'a is exactly parallel thereto; the same applies with respect to the surfaces 58'b and 56'a of the elements 12'b and 12'a.

The wedge angles β and γ are selected so as to be equal to the angle α for convenient and practical purposes since one needs only to place the surface 52' of the beam splitter 10'a and the surface 56'a of the beam splitter 12'a against a common planar surface so as to cause the surfaces 52' and 56'a to be parallel with one another in order to ensure that the correct angle of inclination α is defined between the partially reflective surfaces 52' and 56'.

The wavemeter represented in FIG. 5 may also use two retroreflectors instead of a single retroreflector 16'. In this case, the reference and object beams are caused to travel along non-overlapping paths lying in respective parallel planes which are spacedly separated from one another, as in the embodiment illustrated in FIG. 1.

The interferometric system thus described may not only be used to measure the unknown wavelength of the frequency tunable laser by fringe counting, but also, with a minor modification, to monitor the change of wavelength when the retroreflector is kept fixed (preferably, at the end of its drive for maximum sensitivity). This requires a low thermal drift of the distances between the beam splitters 10 and 12, the mirror 14 and the retroreflector 16. One way of meeting this requirement is by using low expansion invar materials to hold the optical elements or by controlling the temperature of the system. The slow thermal drift of the path difference in the stationary and variable arms of the interferometer may be measured by monitoring any shift of the fringes detected for the reference beam.

In an alternate way, the path difference may be servo-locked using the signal of information provided by the detector 36 for the reference beam: to this end, the mirror 14 is mounted on a piezoelectric transducer; the position of the mirror 14 is dithered by a small amplitude and by a standard control technique a correction voltage is applied to the transducer in order to keep the path difference constant. Then, using the detector 38 associated to the object beam, one simply monitors the fringe shift detected for the object beam to thereby provide a signal of information related to a change in the wavelength of the object beam. One notes that the system considered here is extremely close to being exactly thermally compensated, and therefore changes in the temperature of the beam splitters are unimportant. This system has the advantage over a Fabry-Perot reference cavity to introduce no feedback to the laser sources. In conclusion, by only mounting the mirror 14 on a piezoelectric transducer and by clamping the retroreflector 16 at the end of its drive (using, for example, an electromagnet), the wavelength meter may be used as well as a wavelength monitor.

Finally, one can also use the signal provided by the detector 38 for the object beam so as to stabilize the wavelength thereof, by feeding such signal to phase-lock loop means associated to the laser source 22, as described by A. D. White in "Frequency Stabilization of Gas Lasers," IEEE J. of Quantum Electronics, Vol. QE-1, No. 8, pp. 349–357, November 1965.

I claim:

1. In a method of measuring the wavelength of an object beam of electromagnetic radiation generated from a first source means by comparing with a reference beam of known wavelength generated from a second source means in a fringe-counting Michelson-type interferometer having a stationary arm and a variable arm and including planar beam splitting means for splitting each of said reference and object beams into first and second beam portions, planar beam mixing means for recombining the respective first and second beam portions of said reference and object beams, planar reflection means arranged in said stationary arm for reflecting the respective first beam portion of said reference and object beams to said beam mixing means and movable retroreflection means having an optical center and arranged in said variable arm for reflecting the respective second beam portion of said reference and object beams to said beam mixing means, the improvement which comprises aligning said reference and object beams to provide a flat interference pattern for each of said beams sent to said beam splitting means at only one incident direction, prior to moving said retroreflection means, by causing said reference and object beams to travel along respective optical paths lying in respective parallel planes which normally intersect the planes of said beam splitting means, said beam mixing means and said reflection means and pass through the optical center of said retroreflection means, the respective second beam portion of said reference and object beams being directed to and reflected by said retroreflection means off center thereof, reflecting with said reflection means the respective first beam portion of said reference and object beams at an angle of reflection α, and disposing said beam mixing means relative to said beam splitting means such that the plane of said beam mixing means is angularly inclined with respect to the plane of said beam splitting means by an angle equal to α and that said beam mixing means is oriented to receive the respective reflected first and second beam portions of said reference and object beams symmetrically with respect to the plane thereof, whereby parallelism of said second beam portions with one another in the variable arm of the interferometer is automatically provided as a result of said alignment of said reference and object beams to a flat interference pattern, without optical feedback of said beams to their respective source means and parasitic diffraction effects by said retroreflection means.

2. A method as claimed in claim 1, wherein said reference and object beams travel in the same direction along non-overlapping paths lying in respective parallel planes which are spacedly separated from one another.

3. A method as claimed in claim 1, wherein said reference and object beams travel in opposite directions along overlapping paths lying in a common plane.

4. A method as claimed in claim 1, wherein use is made of two beam splitters as said beam splitting means and beam mixing means, each of said beam splitters having a planar partially reflective surface and an opposed parallel surface.

5. A method as claimed in claim 4, wherein said reference and object beams travel in the same direction along non-overlapping paths lying in respective parallel planes which are spacedly separated from one another, and wherein said reference and object beams are polarized parallelly to said spaced planes and are both directed from their respective source means onto the partially reflective surface of one of said beam splitters at an angle of incidence i substantially equal to Brewster angle, the respective first beam portion of said reference and object beams reflected by said reflection means being directed onto the partially reflective surface of the other beam splitter at an angle of incidence i' also substantially equal to said Brewster angle, whereby parasitic reflection at said opposed parallel surfaces of said beam splitters is avoided.

6. A method as claimed in claim 5, wherein the angle of incidence i is selected such that i=Brewster angle (for the average wavelength to be measured)$-\alpha/2$, whereby the angle of incidence i'=Brewster angle (for the average wavelength to be measured)$+\alpha/2$.

7. A method as claimed in claim 4, wherein said reference and object beams travel in opposite directions along overlapping paths lying in a common plane, and wherein said reference and object beams are polarized parallely to said common plane and one of said reference and object beams is directed from its respective source means onto the partially reflective surface of one of said beam splitters at an angle of incidence i substantially equal to Brewster angle, the first beam portion of said one beam reflected by said reflection means being directed onto the partially reflective surface of the other beam splitter at an angle of incidence i' also substantially equal to said Brewster angle, whereby parasitic reflection at said opposed parallel surfaces of said beam splitters is avoided.

8. A method as claimed in claim 7, wherein said one beam is said object beam.

9. A method as claimed in claim 8, wherein the angle of incidence i is selected such that i=Brewster angle (for the average wavelength to be measured)$-\alpha/2$, whereby the angle of incidence i'=Brewster angle (for the average wavelength to be measured)$+\alpha/2$.

10. A method as claimed in claim 1, 6 or 9, wherein the angle $\alpha$ is about 5°.

11. A method as claimed in claim 1, wherein use is made of two wedge-shaped beam splitters as said beam splitting means and beam mixing means, each of said wedge-shaped beam splitters having a planar partially reflective surface and an opposed planar surface which is angularly inclined relative to said partially reflective surface by a wedge angle and defining a prism so as to avoid parasitic reflection at said opposed surface, one of said beam splitters having a wedge angle $\beta$ and the other having a wedge angle $\gamma$, the plane defined by the partially reflective surface of said one beam splitter being angularly inclined with respect to the plane defined by the partially reflective surface of said other beam splitter by said angle $\alpha$, and wherein a wedge-shaped compensator having opposed planar surfaces with a wedge angle defined therebetween is associated with each of said beam splitters for compensating prismatic dispersion thereof, each compensator having the same wedge angle as its associated beam splitter and each being disposed such that one of said planar surfaces thereof faces the opposed surface of its associated beam splitter and is parallel thereto.

12. A method as claimed in claim 11, wherein the wedge angles $\beta$ and $\gamma$ are selected such that $\beta=\gamma=\alpha$ and wherein said beam splitters are disposed such that the planes defined by said partially reflective surface of said one beam splitter and by said opposed surface of said other beam splitter are parallel to one another.

13. A method as claimed in claim 1, wherein use is made of a cat's eye retroreflector as said retroreflector means for reflecting the respective second beam portion of said reference and object beams to said beam mixing means.

14. A method as claimed in claim 1, wherein said reference beam is pre-aligned to provide a flat interference pattern for a predetermined angle $\alpha$.

15. A method of measuring the wavelength of an object beam of electromagnetic radiation by comparing with a reference beam of known wavelength in a fringe-counting Michelson-type interferometer having a stationary arm and a variable arm, which comprises the steps of:

splitting said reference beam to form first and second beam portions travelling respective optical path lengths in said stationary and variable arms and oriented symmetrically with respect to a first plane, reflecting said first reference beam portion in said stationary arm at an angle of reflection $\alpha$ and reflecting said second reference beam portion in said variable arm while varying the optical path length travelled thereby, the reflected first and second reference beam portions being symmetrical with respect to a second plane which is angularly inclined with respect to said first plane by an angle equal to $\alpha$;

recombining the reflected first and second reference beam portions and detecting the number of fringes generated by the interference thereof as the optical path length travelled by said second reference beam portion is varied;

splitting said object beam to form first and second beam portions travelling respective optical path lengths in said stationary and variable arms and oriented symmetrically with respect to one of said first and second planes, reflecting said first object beam portion in said stationary arm at the same angle of reflection $\alpha$ and reflecting said second object beam portion in said variable arm while varying the optical path length travelled thereby to the same extent as the optical path length travelled by said second reference beam portion is varied, the reflected first and second object beam portions being symmetrical with respect to the other of said planes;

recombining the reflected first and second object beam portions and detecting the number of fringes generated by the interference thereof as the optical path length travelled by said second object beam portion is varied; and comparing the numbers of fringes corresponding to said reference and object beams to thereby determine the wavelength of said object beam.

16. A method as claimed in claim 15, including the additional steps of monitoring any shift of the fringes detected for said reference beam so as to provide a signal of information related to a change of path lengths travelled by said first and second reference beam portions in said stationary and variable arms, either before or after the respective path length travelled by the respective second beam portion of said reference and object beams in said variable arm is varied, servo-locking in response to said signal the optical path lengths travelled in said stationary and variable arms such as to maintain constant any difference in said path lengths, and thereafter monitoring any shift of the fringes detected for said object beam so as to provide a further signal of information related to a change in the wavelength of said object beam.

17. A method as claimed in claim 16, including the further step of feeding said further signal to phase-lock loop means associated with said object beam so as to stabilize the wavelength of said object beam.

18. In a fringe-counting Michelson-type interferometer for measuring the wavelength of an object beam of electromagnetic radiation generated from a first source means by comparing with a reference beam of known wavelength generated from a second source means, said interferometer having a stationary arm and a variable arm and including planar beam splitting means for splitting each of said reference and object beams into first and second beam portions, planar beam mixing means for recombining the respective first and second beam portions of said reference and object beams, planar reflection means arranged in said stationary arm for reflecting the respective first beam portion of said reference and object beams to said beam mixing means and movable retroreflection means having an optical center and arranged in said variable arm for reflecting the respective second beam portion of said reference and object beams to said beam mixing means, the improvement wherein said beam splitting means, beam mixing means, reflection means and retroreflection means are optically coupled to each other and to said source means so as to cause said reference and object beams to travel along respective optical paths lying in respective parallel planes which normally intersect the planes of said beam splitting means, said beam mixing means and said reflection means and pass through the optical center of said retroreflection means, said retroreflection means being positioned to receive and to reflect off center thereof the respective second beam portion of said reference and object beams, said reflection means being positioned to reflect the respective first beam portion of said reference and object beams at an angle of reflection $\alpha$, said beam mixing means being disposed relative to said beam splitting means such that the plane of said beam mixing means is angularly inclined with respect to the plane of said beam splitting means by an angle equal to $\alpha$ and that said beam mixing means is oriented to receive the respective reflected first and second beam portions of said reference and object beams symmetrically with respect to the plane thereof, whereby alignment of said reference and object beams to provide a flat interference pattern prior to moving said retroreflection means is achieved for each of said beams sent to said beam splitting means at only one incident direction and automatically provides parallelism of said second beam portions with one another in said variable arm, without optical feedback of said beams to their respective source means and parasitic diffraction effects by said retroreflection means.

19. An interferometer as claimed in claim 18, including said second source means for generating said reference beam of known wavelength, said second source means being pre-positioned to provide a flat interference pattern for a predetermined angle $\alpha$.

20. An interferometer as claimed in claim 19, including adjustable beam directing means for receiving said object beam generated from said first source means and directing same to said beam splitting means such that said object beam follows a path lying in the desired plane and said first beam portion thereof is reflected by said reflection means at the desired angle $\alpha$.

21. An interferometer as claimed in claim 20, wherein said beam directing means comprises an apertured element for receiving through the aperture thereof said object beam, a detector optically coupled to said apertured element for detecting the intensity of said beam received through said aperture, and a beam splitter mounted in the path of said object beam between said apertured element and said detector for reflecting a portion of said object beam to said beam splitting means and for transmitting another portion of said beam to said detector, said apertured element and said detector being positioned to cause said beam to pass through said beam splitter at a point located in said desired plane, said bottom splitter being rotatably mounted to vary the direction of said reflected beam portion.

22. An interferometer as claimed in claim 20, wherein said second source means and said beam directing means are disposed relative to one another so as to cause said reference and object beams to travel in the same direction along non-overlapping paths lying in respective parallel planes which are spacedly separated from one another.

23. An interferometer as claimed in claim 20, wherein said second source means and said beam directing means are disposed relative to one another so as to cause said reference and object beams to travel in opposite directions along overlapping paths lying in a common plane.

24. An interferometer as claimed in claim 22, wherein said beam splitting means and beam mixing means comprise two beam splitters, each of said beam splitters having a planar partially reflective surface and an opposed parallel surface, said partially reflective surface being provided with a different partially reflective coating for each of said reference and object beams.

25. An interferometer as claimed in claim 23, wherein said beam splitting means and beam mixing means comprise two beam splitters, each of said beam splitters having a planar partially reflective surface and an opposed parallel surface, said partially reflective surface being provided with a single partially reflective coating.

26. An interferometer as claimed in claim 24, wherein said second source means includes means for polarizing said reference beam parallely to said spaced planes, said object beam generated from said first source means being similarly polarized, and wherein said second source means and said beam directing means are positioned to direct both said reference and object beams onto the partially reflective surface of one of said beam splitters at an angle of incidence i substantially equal to Brewster angle, whereby the respective first beam portion of said reference and object beams reflected by said reflection means is directed onto the partially reflective surface of the other beam splitter at an angle of incidence i' also substantially equal to said Brewster angle.

27. An interferometer as claimed in claim 26, wherein the angle of incidence i=Brewster angle (for the average wavelength to be measured) $-\alpha/2$, whereby the angle of incidence i'=Brewster angle (for the average wavelength to be measured) $+\alpha/2$.

28. An interferometer as claimed in claim 25, wherein said second source means includes means for polarizing said reference beam parallely to said common plane, said object beam generated from said first source means being similarly polarized, and wherein said beam directing means is positioned to direct said object beam onto the partially reflective surface of one of said beam splitters at an angle of incidence i substantially equal to Brewster angle, whereby the first beam portion of said object beam reflected by said reflection means is directed onto the partially reflective surface of the other beam splitter at an angle of incidence i' also substantially equal to said Brewster angle.

29. An interferometer as claimed in claim 28, wherein the angle of incidence i=Brewster angle (for the average wavelength to be measured) $-\alpha/2$, whereby the angle of incidence i'=Brewster angle (for the average wavelength to be measured) $+\alpha/2$.

30. An interferometer as claimed in claim 18, 27 or 29, wherein the angle $\alpha$ is about 5°.

31. An interferometer as claimed in claim 18, wherein said beam splitting means and beam mixing means comprise two wedge-shaped beam splitters, each of said wedge-shaped beam splitters having a planar partially reflective surface and an opposed planar surface which is angularly inclined relative to said partially reflective surface by a wedge angle and defining a prism so as to avoid parasitic reflection at said opposed surface, one of said beam splitters having a wedge angle $\beta$ and the other having a wedge angle $\gamma$, the plane defined by the partially reflective surface of said one beam splitter being angularly inclined with respect to the plane defined by the partially reflective surface of said other beam splitter by said angle $\alpha$, and wherein a wedge-shaped compensator having opposed planar surfaces with a wedge angle defined therebetween is associated with each of said beam splitters for compensating prismatic dispersion thereof, each compensator having the same wedge angle as its associated beam splitter and each being disposed such that one of said planar surfaces thereof faces the opposed surface of its associated beam splitter and is parallel thereto.

32. An interferometer as claimed in claim 31, wherein the wedge angles $\beta$ and $\gamma$ are equal to the angle $\alpha$ and wherein said beam splitters are disposed such that the planes defined by said partially reflective surface of said one beam splitter and by said opposed surface of said other beam splitter are parallel to one another.

33. An interferometer as claimed in claim 18, wherein said movable retroreflection means comprises a cat's eye retroreflector mounted on a movable carriage for translating said retroreflector to vary the optical path length travelled by the respective second beam portion of said reference and object beams in said variable arm.

34. A fringe-counting Michelson-type interferometer for measuring the wavelength of an object beam of electromagnetic radiation generated from a first source means by comparing with a reference beam of known wavelength, said interferometer having a stationary arm and a variable arm and comprising:
   a second source means for generating said reference beam of known wavelength;
   means for splitting each of said reference and object beams into first and second beam portions travelling respective optical path lengths in said stationary and variable arms and oriented symmetrically with respect to a respective first plane;
   reflection means in said stationary arm for reflecting the respective first beam portion of said reference and object beams at an angle of reflection $\alpha$;
   retroreflection means in said variable arm for reflecting the respective second beam portion of said reference and object beams, said retroreflection means being movable to equally vary the optical path lengths travelled by said second beam portions, said reflection means and said retroreflection means being arranged so as to orient the respective reflected first and second beam portions of said reference and object beams symmetrically with respect to a respective second plane which is angularly inclined relative to said respective first plane by an angle equal to $\alpha$;
   means positioned in said respective second plane for recombining the respective reflected first and second beam portions of said reference and object beams;
   first output means for detecting the number of fringes produced by the reference beam interference; and
   second output means for detecting the number of fringes produced by the object beam interference.

35. An interferometer as claimed in claim 34, including releasable holding means for holding said retroreflection means in a fixed position either before or after the respective optical path length travelled by the respective second beam portion of said reference and object beams in said variable arm is varied, first monitoring means associated with said first output detecting means for monitoring any shift of the fringes detected for said reference beam and for producing a signal of information related to a change of path lengths travelled by said first and second reference beam portions in said stationary and variable arms, servo-locking means responsive to said signal for maintaining constant any difference in the optical path lengths travelled in said stationary and variable arms, and second monitoring means associated with said second output detecting means for monitoring any shift of the fringes detected for said object beam and for producing a further signal of information related to a change in the wavelength of said object beam.

36. An interferometer as claimed in claim 35, including phase-lock loop means associated with said first source means and responsive to said further signal for stabilizing the wavelength of said object beam.

* * * * *